US008250486B2

(12) United States Patent
Lentz (10) Patent No.: US 8,250,486 B2
(45) Date of Patent: Aug. 21, 2012

(54) COMPUTER CONTROLLED USER INTERACTIVE DISPLAY INTERFACE FOR ACCESSING GRAPHIC TOOLS WITH A MINIMUM OF DISPLAY POINTER MOVEMENT (75) Inventor: James Lee Lentz, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 1653 days.

(21) Appl. No.: 11/335,449

(22) Filed: Jan. 19, 2006

(65) Prior Publication Data
US 2007/0168873 A1 Jul. 19, 2007

(51) Int. Cl.
G06F 3/048 (2006.01)
(52) U.S. Cl. ........ 715/828; 715/711; 715/767; 715/808; 715/810; 715/840; 715/845; 715/856
(58) Field of Classification Search .................. None
See application file for complete search history.

(56) References Cited

U.S. PATENT DOCUMENTS

| 5,798,752 A | | 8/1998 | Buxton et al. | |
| 6,058,304 A | * | 5/2000 | Callaghan et al. | 455/422.1 |
| 6,091,416 A | | 7/2000 | Cragun | |
| 6,097,853 A | * | 8/2000 | Gu et al. | 382/282 |
| 6,246,411 B1 | | 6/2001 | Strauss | |
| 7,093,005 B2 | * | 8/2006 | Patterson | 709/220 |
| 7,174,042 B1 | * | 2/2007 | Simmons et al. | 382/187 |
| 7,185,278 B1 | * | 2/2007 | Simmons | 715/235 |
| 7,188,309 B2 | * | 3/2007 | Simmons et al. | 715/244 |
| 7,242,387 B2 | * | 7/2007 | Fitzmaurice et al. | 345/157 |
| 7,259,752 B1 | * | 8/2007 | Simmons | 345/173 |
| 7,358,965 B2 | * | 4/2008 | Barabe et al. | 345/179 |
| 7,454,717 B2 | * | 11/2008 | Hinckley et al. | 715/863 |
| 7,486,274 B2 | * | 2/2009 | Forlines et al. | 345/157 |
| 7,486,302 B2 | * | 2/2009 | Shoemaker | 345/661 |
| 7,526,737 B2 | * | 4/2009 | Simmons et al. | 715/856 |
| 7,580,036 B2 | * | 8/2009 | Montagnese et al. | 345/427 |
| 7,659,890 B2 | * | 2/2010 | Simmons | 345/179 |
| 7,667,699 B2 | * | 2/2010 | Komar et al. | 345/427 |
| 7,714,859 B2 | * | 5/2010 | Shoemaker et al. | 345/427 |
| 7,721,226 B2 | * | 5/2010 | Barabe et al. | 715/810 |
| 7,737,976 B2 | * | 6/2010 | Lantin | 345/427 |
| 7,751,623 B1 | * | 7/2010 | Simmons et al. | 382/186 |
| 7,761,713 B2 | * | 7/2010 | Baar | 713/182 |
| 7,770,135 B2 | * | 8/2010 | Fitzmaurice | 715/856 |
| 7,773,101 B2 | * | 8/2010 | Shoemaker | 345/661 |
| 7,814,439 B2 | * | 10/2010 | Fitzmaurice et al. | 715/856 |
| 7,916,979 B2 | * | 3/2011 | Simmons | 382/321 |
| 7,966,570 B2 | * | 6/2011 | Doyle et al. | 715/781 |
| 7,978,210 B2 | * | 7/2011 | Jetha et al. | 345/647 |
| 7,983,473 B2 | * | 7/2011 | Tigges | 382/154 |
| 7,995,078 B2 | * | 8/2011 | Baar | 345/660 |
| 8,031,206 B2 | * | 10/2011 | Shoemaker | 345/619 |

(Continued)

Primary Examiner — Boris Pesin
Assistant Examiner — John Heffington
(74) Attorney, Agent, or Firm — J. B. Kraft; David A. Mims (57) ABSTRACT A computer controlled graphical user interface implementation comprising displaying a set of graphic tools in a primary container location on the display in combination with an implement for using a selected tool to create a graphic object at a selected display location that is changeable as the object is being created in which there are provided functions responsive to the creation of the graphic object for displaying a secondary container containing a duplicate of the selected tool proximate the location of the graphic object, the secondary container being dynamically moveable responsive to the graphics object creation.

11 Claims, 8 Drawing Sheets

U.S. PATENT DOCUMENTS

| | | | |
|---|---|---|---|
| 8,106,927 B2 * | 1/2012 | Shoemaker et al. | 345/665 |
| 8,139,089 B2 * | 3/2012 | Doyle et al. | 345/647 |
| 2004/0024624 A1 * | 2/2004 | Ciscon et al. | 705/7 |
| 2004/0135824 A1 * | 7/2004 | Fitzmaurice | 345/856 |
| 2004/0141010 A1 * | 7/2004 | Fitzmaurice et al. | 345/810 |
| 2004/0141015 A1 * | 7/2004 | Fitzmaurice et al. | 345/856 |
| 2004/0146221 A1 * | 7/2004 | Siegel et al. | 382/305 |
| 2004/0237051 A1 * | 11/2004 | Clauson | 715/825 |
| 2005/0024322 A1 * | 2/2005 | Kupka | 345/156 |
| 2005/0073528 A1 * | 4/2005 | Gu | 345/589 |
| 2005/0096543 A1 * | 5/2005 | Jackson et al. | 600/441 |
| 2005/0188322 A1 * | 8/2005 | Napoleon | 715/760 |
| 2005/0283305 A1 * | 12/2005 | Clark et al. | 701/120 |
| 2006/0026526 A1 * | 2/2006 | Simister et al. | 715/746 |
| 2006/0259499 A1 * | 11/2006 | Moulckers et al. | 707/100 |
| 2007/0040800 A1 * | 2/2007 | Forlines et al. | 345/158 |
| 2007/0168890 A1 * | 7/2007 | Zhao et al. | 715/863 |
| 2007/0226657 A1 * | 9/2007 | Fitzmaurice et al. | 715/863 |

\* cited by examiner

COMPUTER CONTROLLED USER INTERACTIVE DISPLAY INTERFACE FOR ACCESSING GRAPHIC TOOLS WITH A MINIMUM OF DISPLAY POINTER MOVEMENT

TECHNICAL FIELD

The present invention relates to the graphics implemented on interactive computer controlled displays and particularly to display graphics constructed using any conventional graphics tool palette.

BACKGROUND OF RELATED ART

Computers and their application programs are used in all aspects of business, industry and academic endeavors. In recent years, there has been a technological revolution driven by the convergence of the data processing industry with the consumer electronics industry. This advance has been even further accelerated by the extensive consumer and business involvement in the Internet. As a result of these changes, it seems as if virtually all aspects of human productivity in the industrialized world require human/computer interaction. The computer industry has been a force for bringing about great increases in business and industrial productivity.

In addition, the computer and computer related industries have benefited from a rapidly increasing availability of data processing functions. Such increased data processing functions have made complex text processing functions and a wide variety of accounting and business tracking functions easy to use by even unsophisticated or novice computer users. Ease of use in the creation of computer generated graphics has been advancing at a somewhat slower pace insofar as unsophisticated users are concerned. The present invention is concerned with ease of use in computer generated graphics, and is particularly concerned with making the tools used to create computer graphics readily available so that the users may easily and intuitively use such tools for their best purpose.

By way of background, conventional graphical user interfaces include word processors, Integrated Development Environments (IDEs), presentation tools, such as Microsoft(™) PowerPoint(™), spreadsheets and drawing tools. These tool systems conventionally involve a work area where the graphic object is constructed and modified, as well as at least one container or palette that contains the tools, usually in the form of text items or icons. The construction of the graphic object conventionally consists of a sequence of operations by the user constructing the graphic object that may be summarized as follows: the user picks a tool from the container or palette; the tool is moved to the location of the graphic object being constructed; graphic construction work using the tool; and finally release of the tool. The user may, at this point, pick another tool and continue construction or construct another graphic object at another location. Accordingly, the construction process is continued with the locus of interaction changing from one location to another within the work area.

The present invention is concerned with the problems presented in moving a selected tool so that it is readily and easily available to the location of the graphic object construction. The effectiveness of this move operation is dependent upon two factors: 1) minimizing the distance between the selectable tools, while 2) not obscuring or interfering with the graphic objects being constructed.

Currently available graphic object construction methods try to address these factors. One approach is to enable the user to present the tool palette as a pop-up menu. These pop-up menus satisfy the proximity need as they may be brought up close to the graphic object construction. They also satisfy the need not to obscure the object under construction as the menus remain invisible until invoked. However, since these menus remain invisible they lack the prompting capability of visible tool palettes. User positional palettes or tool bars that can be moved into proximity with the object construction are also available. However, in order to maintain the proximity of the tool palette without obscuring the construction, the user must continually relocate the moveable tool palette in order to avoid interference with the dynamically changeable graphic object being constructed.

SUMMARY OF THE PRESENT INVENTION

The present invention offers a solution in the combination of: 1) minimizing the distance between the selectable tools, while 2) not obscuring or interfering with the graphic objects being constructed that avoids the problems of the prior art pop-up menus and moveable tool palettes.

In accordance with the present invention, a computer controlled graphical user interface is implemented comprising means for displaying a set of graphic tools in a primary container location on the display in combination with means for using a selected tool to create a graphic object at a selected display location that is changeable as the object is being created, and in which there is provided means responsive to the creation of the graphic object for displaying a secondary container containing a duplicate of the selected tool proximate the location of the graphic object, the secondary container being dynamically moveable responsive to said graphics object creation.

There are further means for determining the center of activity of said creation of the graphic object so that the changeable display location of the graphic object is determined by the center of activity of the creation of the graphic object. Preferably, the means for determining said center of activity includes means for tracking the sequence of display locations of the most recent movement of the display pointer.

There are also means for establishing an exclusion perimeter enclosing the graphic object being created, and means for preventing the secondary container containing the duplicate of the selected tool from crossing the perimeter, whereby the secondary container does not encroach upon the object being created.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
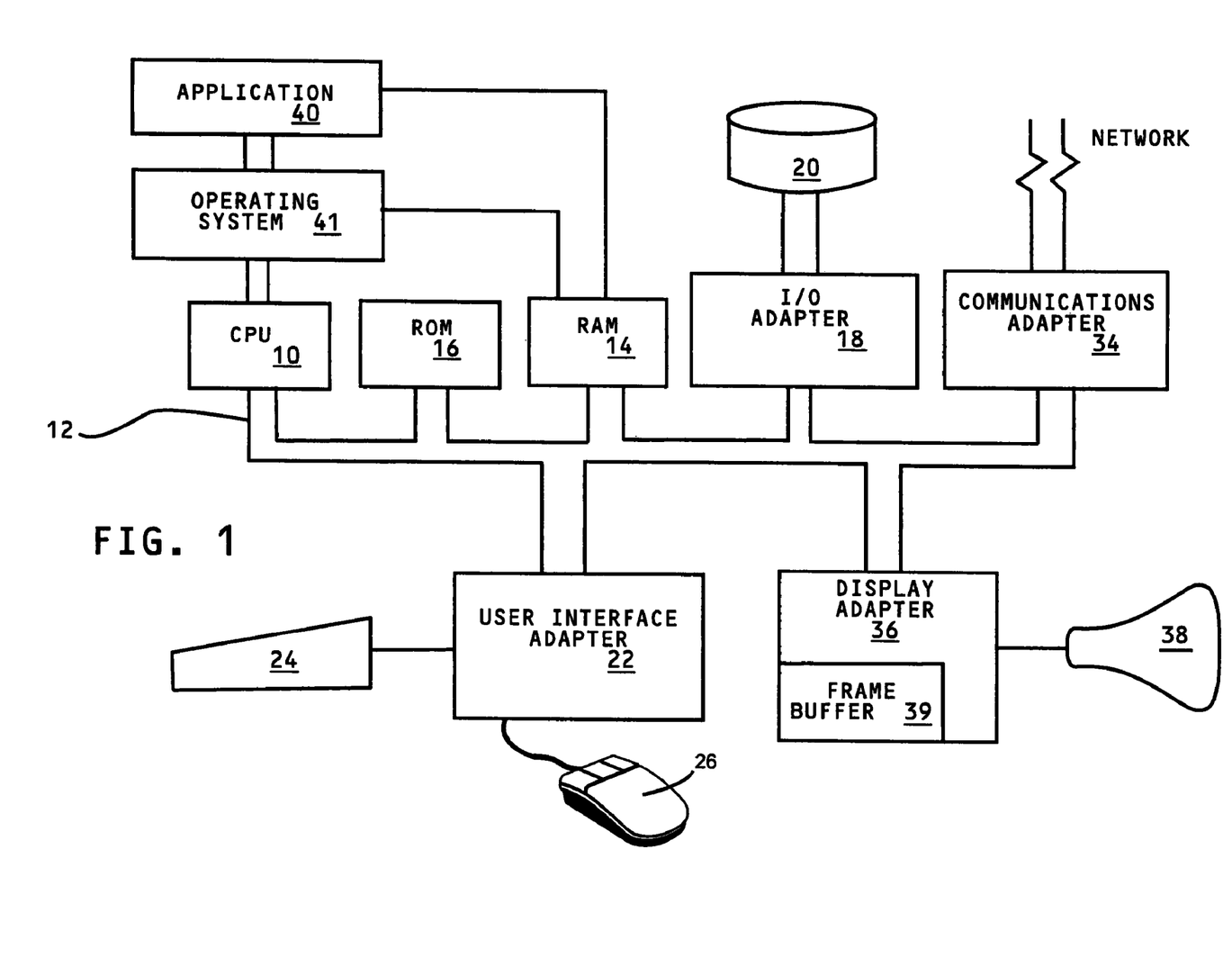
FIG. 1 is a block diagram of an interactive data processing display system including a central processing unit that is capable of displaying and implementing the method of the present invention for creating graphic objects with a minimum of display pointer movement.
Figure 2:
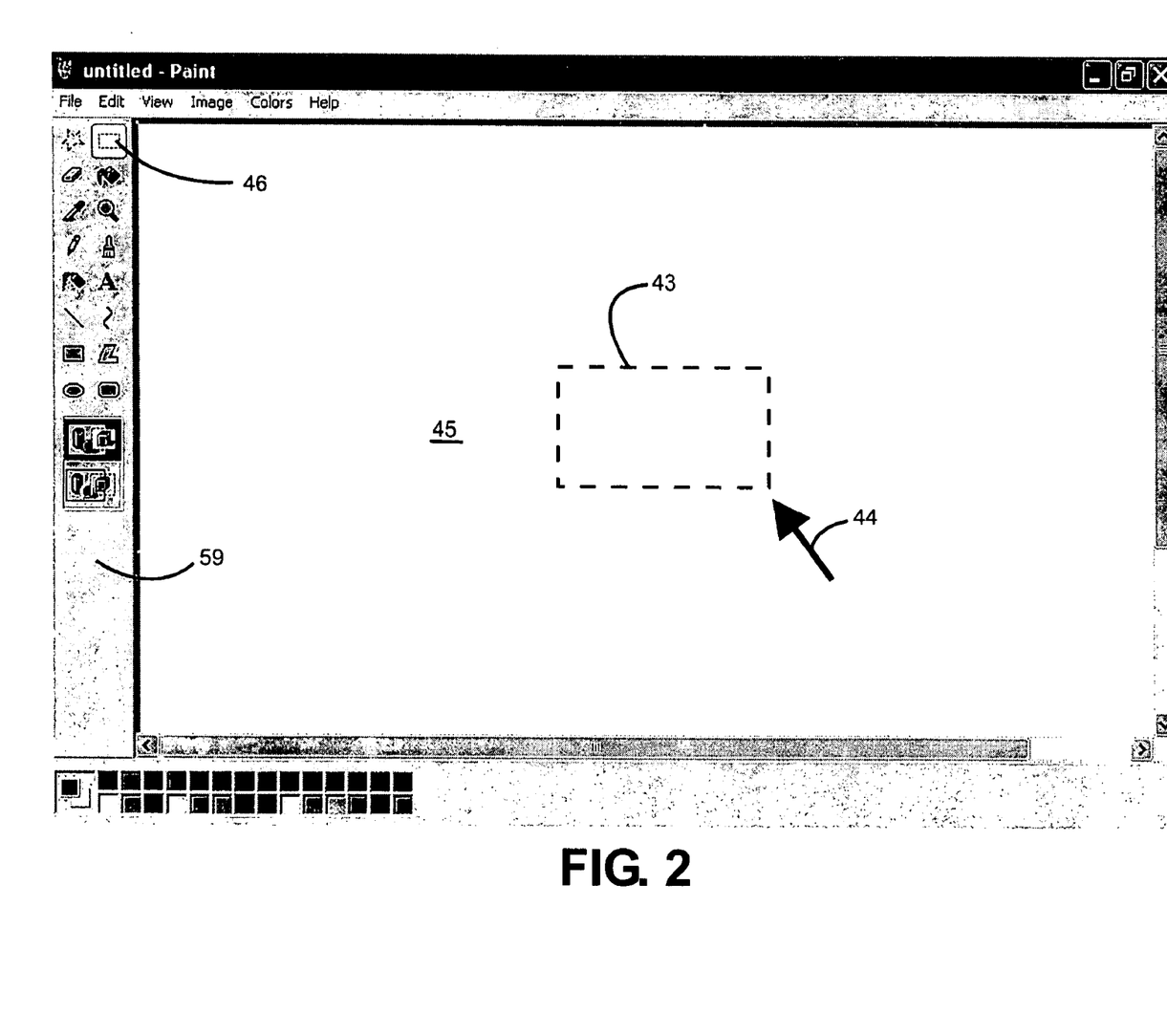
FIG. 2 is a diagrammatic view of a display screen illustrating an initial state wherein a graphic tool has been selected, and the original or starting graphic object under construction is shown.
Figure 3:
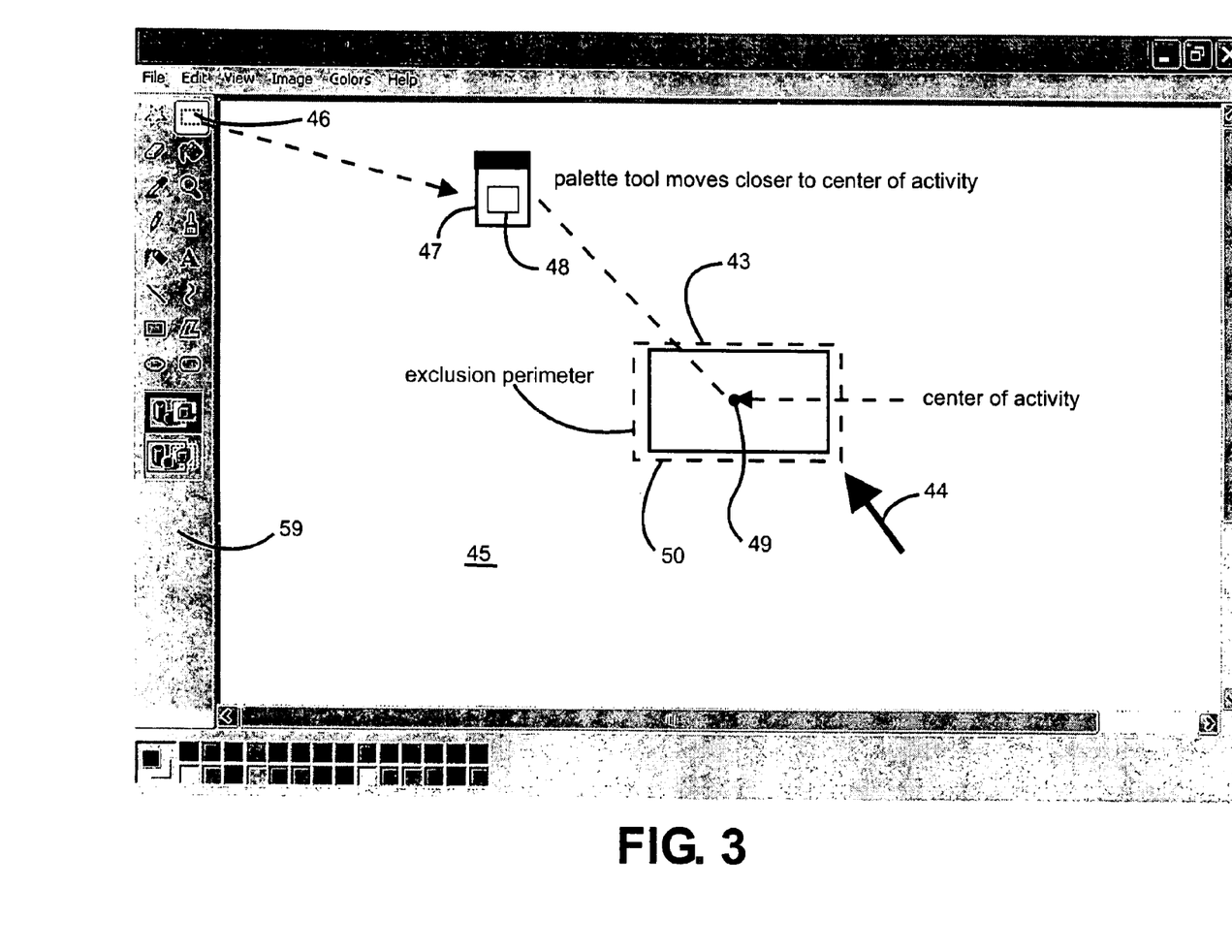
FIG. 3 is the view of the object under construction of FIG. 2 at a next stage when a secondary palette containing a duplicate of the selected tool is provided nearer to the object under construction.
Figure 4:
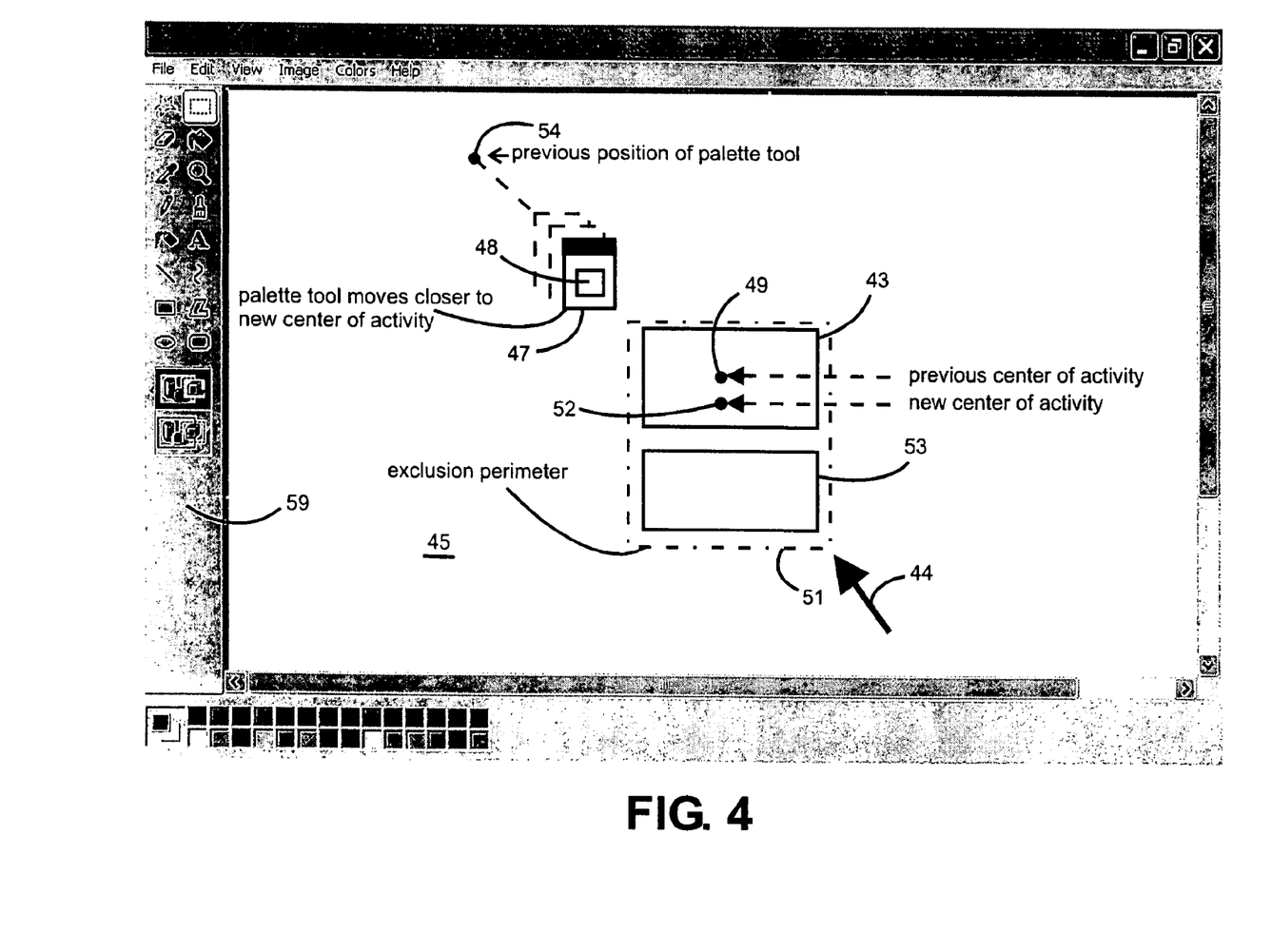
FIG. 4 is the view of the object under construction of, FIG. 3 at a later stage when, as the construction of the graphic object continues, the center of activity shifts and the secondary palette containing a duplicate of the selected tool also moves in response to the shift.
Figure 5:
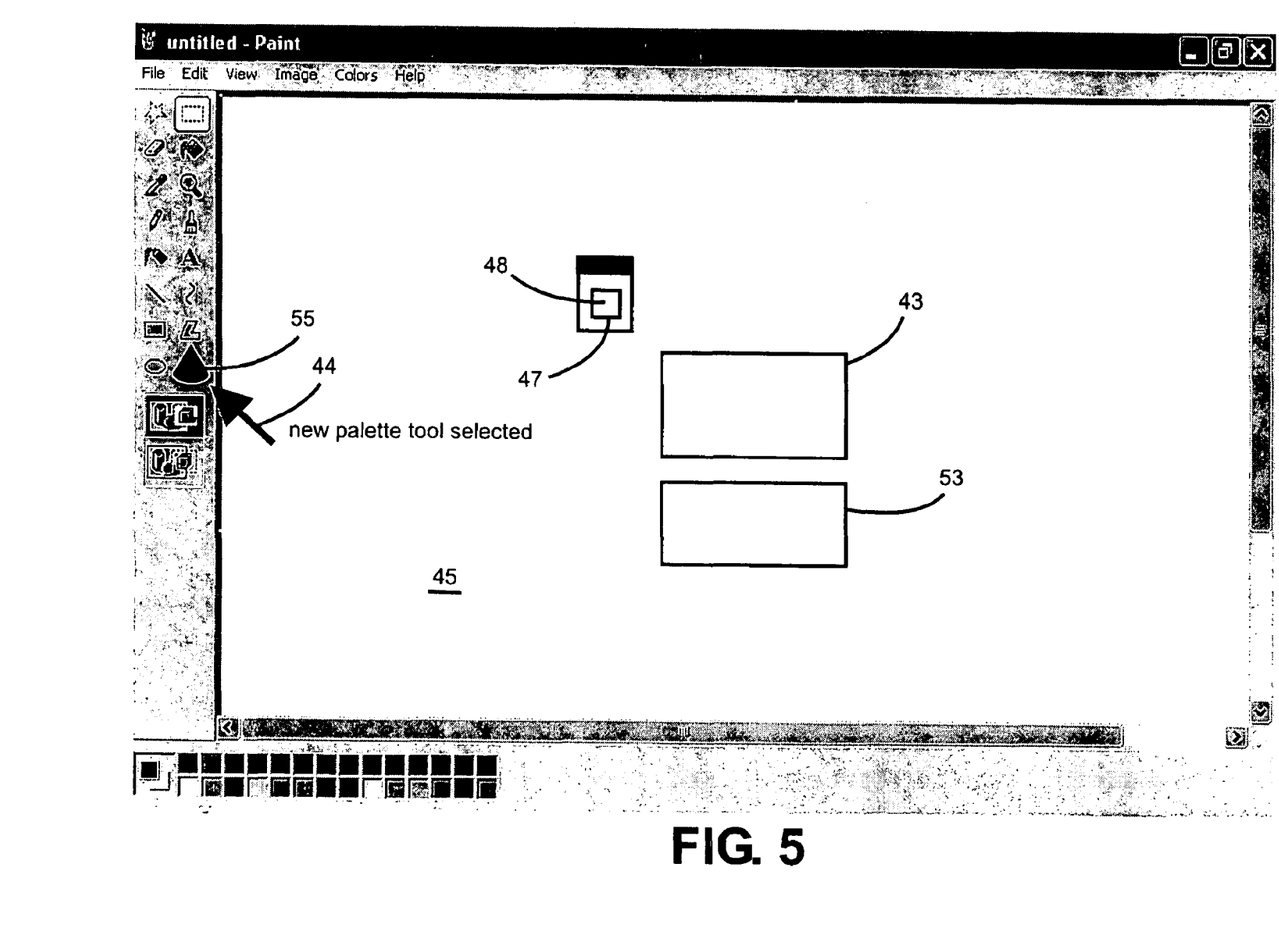
FIG. 5 is the view of the object under construction of FIG. 4 at a later stage when, as the construction of the graphic object continues, an additional new graphics tool is selected.
Figure 6:
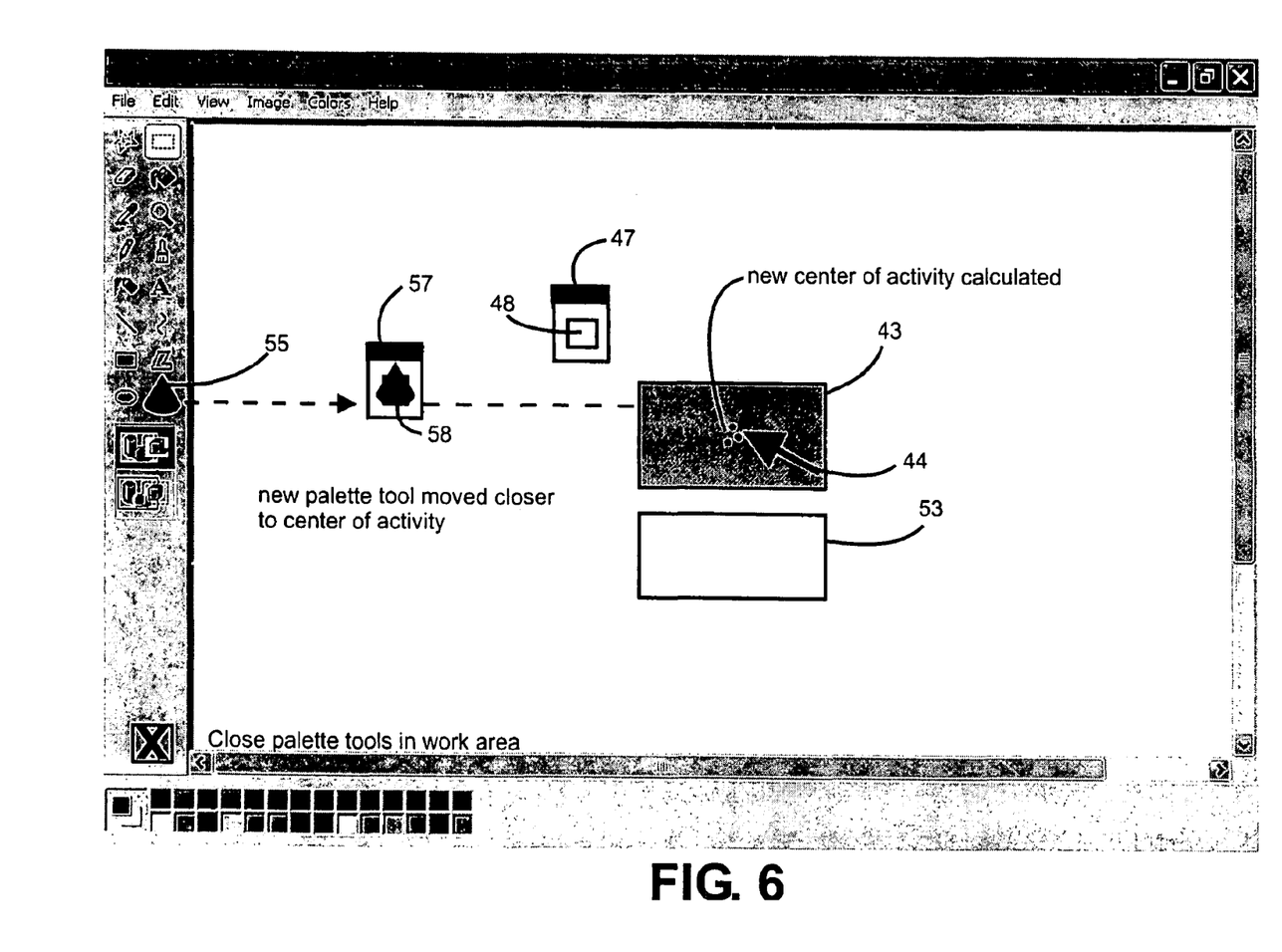
FIG. 6 is the view of the object under construction of FIG. 5 at a next stage when a secondary palette containing a duplicate of the selected additional tool is provided nearer to the object under construction.

Referring to FIG. 1, a typical data processing computer controlled display is shown that may function as a basic computer controlled Web receiving terminal used in implementing the present invention for displaying and manipulating stacked area line graphs. A central processing unit (CPU) 10, such as one of the PC microprocessors or workstations, e.g. RISC System/6000™ series available from International Business Machines Corporation (IBM), or Dell PC microprocessors, is provided and interconnected to various other components by system bus 12. An operating system 41 runs on CPU 10, provides control and is used to coordinate the function of the various components of FIG. 1. Operating system 41 may be one of the commercially available operating systems, such as IBM's AIX 6000™ operating system or Microsoft's WindowsXP™ or Windows2000™, as well as UNIX and other IBM AIX operating systems. Application programs 40, controlled by the system, are moved into and out of the main memory Random Access Memory (RAM) 14. These programs include the programs of the present invention for creating graphic objects with a minimum of display pointer movement that will be described hereinafter. A Read Only Memory (ROM) 16 is connected to CPU 10 via bus 12 and includes the Basic Input/Output System (BIOS) that controls the basic computer functions. RAM 14, I/O adapter 18 and communications adapter 34 are also interconnected to system bus 12. I/O adapter 18 may be a Small Computer System Interface (SCSI) adapter that communicates with the disk storage device 20. Communications adapter 34 interconnects bus 12 with an outside Internet or Web network. I/O devices are also connected to system bus 12 via user interface adapter 22 and display adapter 36. Keyboard 24 and mouse 26 are all interconnected to bus 12 through user interface adapter 22. It is through such input devices that the user may interactively relate to the programs of this invention. Display adapter 36 includes a frame buffer 39 that is a storage device that holds a representation of each pixel on the display screen 38. Images may be stored in frame buffer 39 for display on monitor 38 through various components, such as a digital to analog converter (not shown) and the like. By using the aforementioned I/O devices, a user is capable of inputting information to the system through keyboard 24 or mouse 26 and receiving output information from the system via display 38.

Now with reference to FIGS. 2 through 6, the system of the present invention will be described. The sequence of illustrative windows shown in FIGS. 2 through 6 are generated using the data processing system described in FIG. 1 in which is provided an operating system with a conventional graphics engine, e.g. the graphics/text functions of WindowsXP™. From tool container or palette 59, tool icon 46, a rectangle forming tool is selected and used to begin the construction of the graphic object 43 under user control by the manipulation of mouse directed pointer 44. Based upon the sequence of display screen 45 coordinates through which mouse pointer 44 is moved in the initial creation of rectangular object 43, there is determined, FIG. 3, a center of activity 49, and there is created a duplicate tool 48 of selected tool 46 within a secondary container 47 that is positioned closer, e.g. about halfway between the position of selected tool 46 and the center of activity 49. In addition, so that secondary container 47 does not encroach or intrude upon the construction of graphics object 43 under construction, there is automatically calculated, using a routine that will be described hereinafter, an exclusion perimeter 51 at a predetermined distance from the actual perimeter of the graphic object under construction. Then, as the construction of the graphic object continues, FIG. 4, and an additional rectangle 53 is added to the graphic object, a new center of activity 52 is determined, and container 47 with duplicate tool 48 is moved from its previous position closer to this new center. Of course, it does not encroach upon exclusion perimeter 51 that has been automatically recalculated based upon the changes made in FIG. 4. At this stage, FIG. 5, in the illustrated construction of the graphic object, a new tool, paint tool 55, is selected using pointer 44. Accordingly, FIG. 6, a new secondary palette 47 containing a duplicate 58 of the selected paint tool 55 is created at a position about halfway to the newly recalculated center of activity. Construction, e.g. painting of the graphic object, will continue in this manner wherein a duplicate of the selected tool in a secondary container or palette will be positioned so that the selected tool is available at a position close to the center of activity that does not encroach upon the exclusion perimeter.

Figure 7:
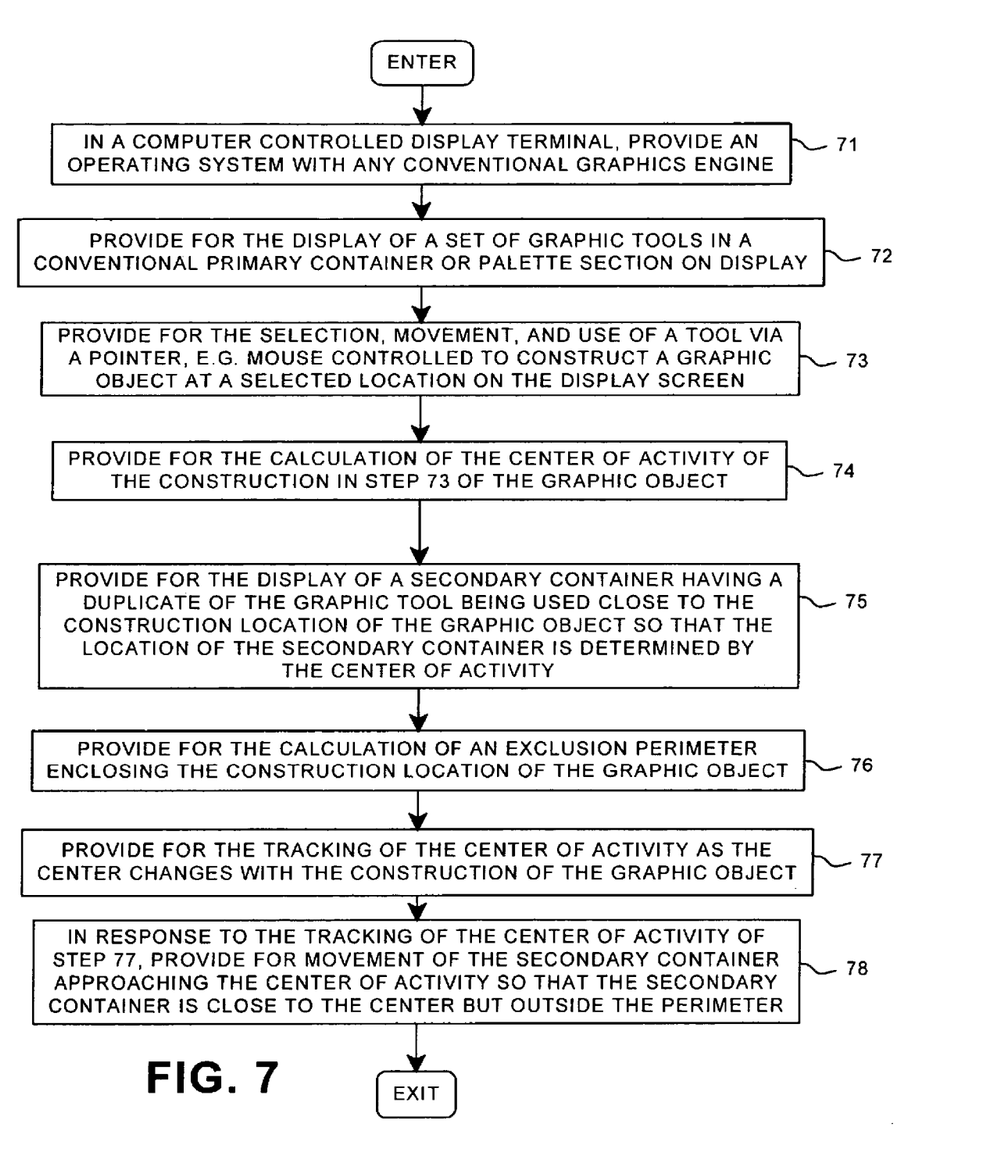
FIG. 7 is an illustrative flowchart describing the setting up of the elements of a program according to the present invention for creating graphic objects with a minimum of display pointer movement.

Now, with reference to FIG. 7, we will describe a process implemented by a program according to the present invention for creating graphic objects with a minimum of display pointer movement. The program routines that are created by the process of FIG. 7 implement the operations described with respect to FIGS. 2 through 6. In a computer controlled display terminal as described in FIG. 1, there is provided an operating system with a graphics engine, e.g. the graphics/text functions of Windows $2000^{XP}$, which, in turn, translates the cursor movements and tool selections into dynamic pixel arrays providing the graphic object construction of this invention, step 71. Accordingly, there is provided a displayed set of graphic tools in a conventional primary container or palette section, usually at a border of the display screen, step 72. There is provision for the selection, movement and use of a graphic tool via a pointer, such as a mouse controlled pointer to construct a graphic object at a selected location on the display screen, step 73. Provision is made, step 74, for the dynamic calculation of the center of activity of the construction being done in step 73. Provision is made for the display of a secondary container containing a duplicate of the selected graphic tool being used located close to the location of the construction, the location of the secondary container being determined by the center of activity, step 75. Provision is also made for the calculation of an exclusion perimeter enclosing the construction location of the graphic object under construction, step 76. Provision is made for the tracking of the center of activity as the center changes with the construction of the graphic object, step 77. For example, when a pointer is moved by the user controlling the mouse, the coordinates of five or six points passed through by the movement may be calculated, and any changes in the center of activity recorded and dynamically implemented on the display screen. Finally, in response to the tracking of the center of activity in step 77, there is provided dynamic movement of the secondary container that approaches the center of activity so that the secondary container including the duplicate tool is close to the center but outside of the perimeter, step 78

Figure 8:
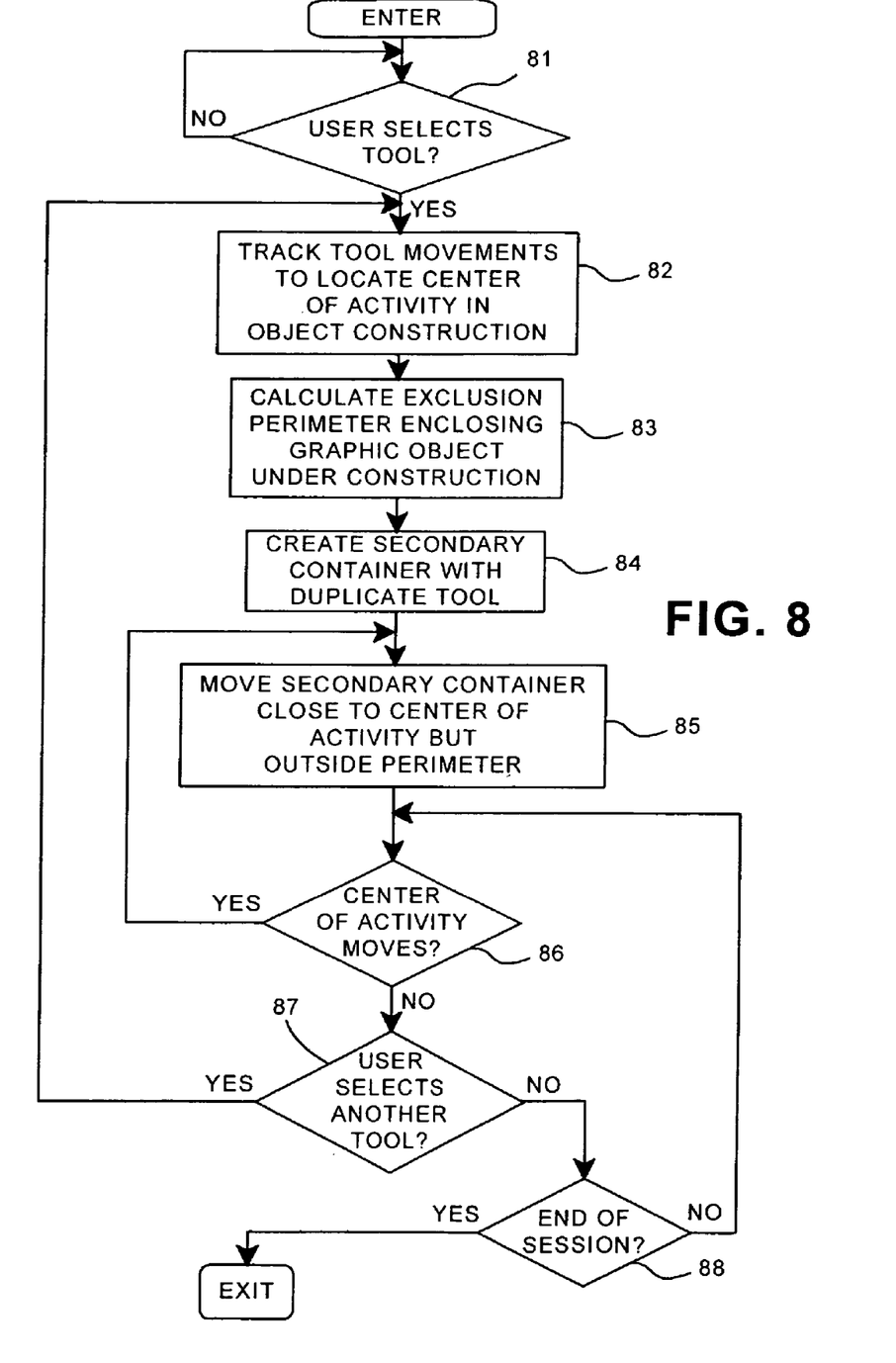
FIG. 8 is a flowchart of an illustrative run of the program set up in FIG. 7.

The running of the process set up in FIG. 7 and described in connection with FIGS. 2 through 6 will now be described with respect to the flowchart of FIG. 8. First, a determination is made, step 81, as to whether the user has selected an initial tool so as to begin the construction of an graphic object. If Yes, the movements of the cursor carrying out the selected tool function are tracked in order to locate the center of activity, step 82. Then the exclusion perimeter of the object under construction is calculated, step 83, and the secondary container containing a duplicate of the selected tool is created, step 84. This secondary container is moved close to the center of activity but outside of the exclusion perimeter, step 85. Next, a determination is made continuously as to whether the center of activity has moved during the object construction, step 86. If Yes, the process is returned to step 85 that is repeated. If No, a further determination is made as to whether the user has selected another tool, step 87. If Yes, the process is returned to step 82, and continued from there. If No, it may be conveniently determined whether the session is to be ended, step 88. If Yes, the session may be exited; if No, the process is returned to step 86.

Although certain preferred embodiments have been shown and described, it will be understood that many changes and modifications may be made therein without departing from the scope and intent of the appended claims.

What is claimed is:

1. In a computer controlled user interactive display system, a display interface implementation for accessing graphic tools for creating graphic objects with minimal display pointer movement comprising:
    means for displaying a set of graphic tools in a primary container location on the display;
    means responsive to the creation of said graphic object providing a secondary container containing a duplicate of said selected tool proximate the location of the graphic object, said secondary container being displayed during the creation of said graphic object and dynamically moveable responsive to said graphic object creation;
    means for determining the center of activity of said creation of said graphic object;
    said changeable display location of said graphic object is determined by the center of activity of said creation of said graphic object;
    means for establishing an exclusion perimeter enclosing the graphic object being created; and
    means for preventing said secondary container containing the duplicate of said selected tool from crossing said perimeter, whereby said secondary container does not encroach upon said object being created.

2. The display interface implementation of claim 1 wherein said means for determining said center of activity includes means for tracking the sequence of display locations of the most recent movement of said display pointer.

3. The display interface implementation of claim 1 further including means responsive to the creation of said graphic object providing at least one additional secondary container containing a duplicate of at least one additional selected tool for creating said graphic object proximate the location of the graphic object, said at least one additional secondary container being dynamically moveable responsive to said graphics object creation.

4. The display interface implementation of claim 3 wherein said means for determining said center of activity includes means for tracking the sequence of display locations of the most recent movement of said display pointer in the activity of said at least one additional graphic tool in the creation of said graphic object.

5. A method for accessing graphic tools with minimal display pointer movement on an interactive display interface for creating graphic objects comprising:
    displaying a set of graphic tools in a primary container location on the display;
    using a selected tool to create a graphic object at a selected display location that is changeable as the object is being created; and
    in response to the creation of said graphic object, providing a secondary container containing a duplicate of said selected tool proximate the location of the graphic object, said secondary container being dynamically moveable responsive to said graphics object creation;
    determining the center of activity of said creation of said graphic object;
    said changeable display location of said graphic object is determined by the center of activity of said creation of said graphic object;
    establishing an exclusion perimeter enclosing the graphic object being created; and
    preventing said secondary container containing the duplicate of said selected tool from crossing said perimeter, whereby said secondary container does not encroach upon said object being created.

6. The display interface implementation of claim 5 wherein said center of activity is determined by tracking the sequence of display locations of the most recent movement of said display pointer.

7. The method of claim 5 further including providing responsive to the creation of said graphic object, at least one additional secondary container containing a duplicate of at least one additional selected tool for creating said graphic object proximate the location of the graphic object, said at least one additional secondary container being dynamically moveable responsive to said graphics object creation.

8. The method of claim 7 wherein said determining said center of activity includes tracking the sequence of display locations of the most recent movement of said display pointer in the activity of said at least one additional graphic tool in the creation of said graphic object.

9. A computer usable medium having stored thereon, a computer program for accessing graphic tools with minimal display pointer movement on an interactive display interface for creating graphic objects, wherein the computer program when executed on a computer causes the computer to:
    display a set of graphic tools in a primary container location on the display;
    use a selected tool to create a graphic object at a selected display location that is changeable as the object is being created; and
    In response to the creation of said graphic object, provide a secondary container containing a duplicate of said selected tool proximate the location of the graphic object, said secondary container being displayed during the creation of said graphic object and dynamically moveable responsive to said graphics object creation;

said computer program when executed further causes the computer to determine the center of activity of said creation of said graphic object;

wherein said computer program when executed causes the computer to determine said changeable display location of said graphic object by the center of activity of said creation of said graphic object;

wherein said computer program when executed further causes the computer to: establish an exclusion perimeter enclosing the graphic object being created; and prevent said secondary container containing the duplicate of said selected tool from crossing said perimeter, wherein said secondary container does not encroach upon said object being created.

10. The computer usable medium of claim 9 wherein said computer program when executed causes the computer to determine said center of activity by tracking the sequence of display locations of the most recent movement of said display pointer.

11. The computer usable medium of claim 9 wherein said computer program when executed further causes the computer to: in response to the creation of said graphic object, provide at least one additional secondary container containing a duplicate of at least one additional selected tool for creating said graphic object proximate the location of the graphic object, said at least one additional secondary container being dynamically moveable responsive to said graphics object creation.

* * * * *